UNITED STATES PATENT OFFICE.

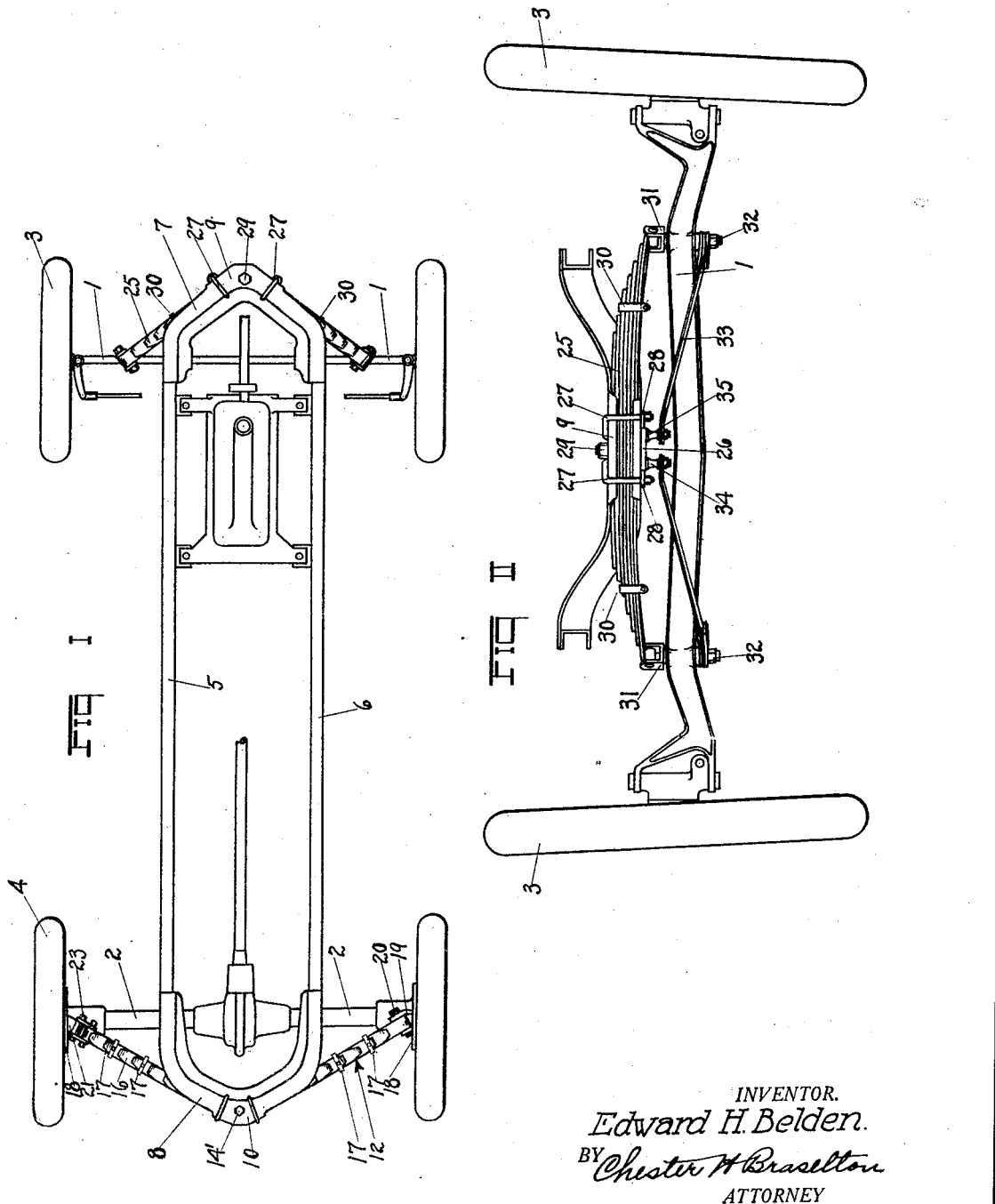

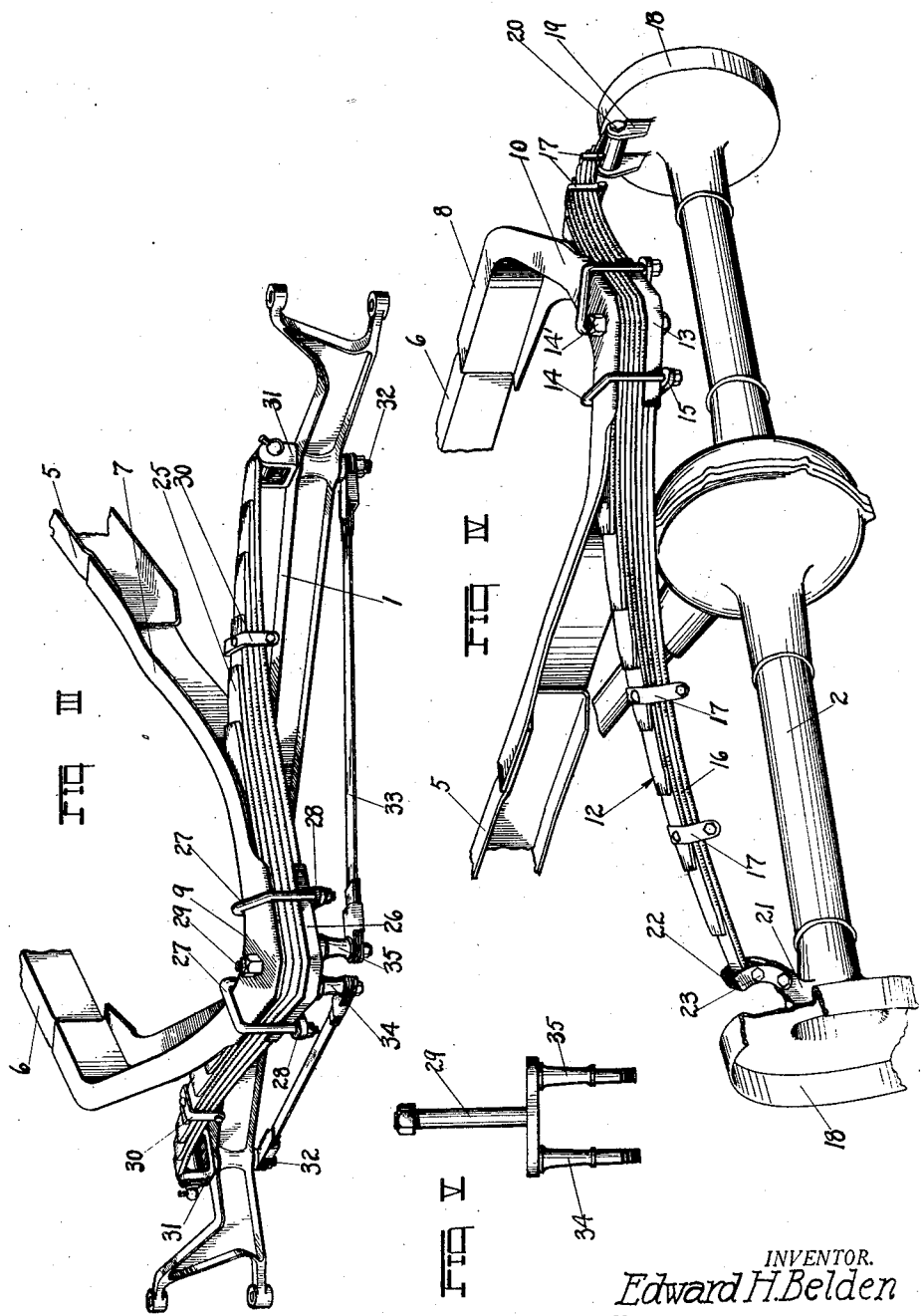

EDWARD H. BELDEN, OF TOLEDO, OHIO, ASSIGNOR TO THE WILLYS-OVERLAND COMPANY, OF TOLEDO, OHIO, A CORPORATION OF OHIO.

SPRING SUSPENSION FOR VEHICLES.

1,407,917.   Specification of Letters Patent.   Patented Feb. 28, 1922.

Application filed October 9, 1919. Serial No. 329,428.

*To all whom it may concern:*

Be it known that I, EDWARD H. BELDEN, residing at Toledo, county of Lucas, State of Ohio, have invented certain new and useful Improvements in Spring Suspensions for Vehicles of which I declare the following to be a full, clear, and exact description.

This invention relates to improvements in spring suspension for vehicles, particularly vehicles of the motor driven type.

One object of the invention is to provide an improved suspension for the frame of a motor vehicle adapted to provide a very easy riding car and one which may be readily steered.

A further object of the invention is to provide a suspension of this character wherein the opposite end portions of the automobile frame are supported from the axles by means of a transversely bowed semi-elliptical spring.

A further object of the invention is to provide an improved form of spring which is particularly adapted for use in connection with motor vehicles whereby the effective length of the spring is increased.

A further object of the invention is to provide a device of this character which is of simple construction and efficient in operation.

Further objects of the invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims. A structure constituting one embodiment of the invention is illustrated in the accompanying drawings forming a part hereof in which:

Figure I is a top plan view of an automobile frame illustrating the position of the springs and axles associated therewith.

Figure II is a front elevational view of the front end portion of the automobile frame illustrating the manner in which the frame is supported from the front axle by the spring.

Figure III is a perspective view of the front end portion of an automobile frame illustrating the manner of positioning the springs with respect to the frame and axle.

Figure IV is a perspective view of the rear portion of the frame illustrating the manner of supporting the rear end portion of the frame from the rear axle.

Figure V is an elevational view of the shackle employed for connecting the forward ends of the radius rods to the frame.

In order to increase the effective length of the springs at the ends of the frame over that obtainable from the use of a pair of cantilever springs at the ends of the frame, applicant proposes to employ a semi-elliptical spring at each end of the frame and by placing the securing devices for securing each spring to the frame near the center longitudinal line of the vehicle frame, a considerable effective length is given whereby the resiliency of the support is increased.

In the embodiment of the invention illustrated herewith, 1 indicates the front axle of the automobile, and 2 the rear axle, the said axles being supported by the usual ground engaging wheels 3 and 4 respectively. The automobile frame comprises a pair of longitudinally extending side frame members 5 and 6 which terminate short of the extreme front and rear portions of the frame and are provided with connecting plates 7 and 8 of similar construction located at the front and rear extremities of the frame and serving to connect the side frame members 5 and 6 while at the same time providing means for supporting the frame from the front and rear axles through supporting springs which will be hereinafter described. The end frame members or plates 7 and 8 are of similar construction, and have intermediate portions 9 and 10 respectively bent downwardly and outwardly whereby the side frame members are supported somewhat above the level of the springs. The end frame members 7 and 8 are securely attached to the front and rear ends of the side frame members 5 and 6 in any suitable or desired manner. The rear spring 12 is of semi-elliptic form having its intermediate portion bowed transversely from the vertical plane passing through the end portions thereof, and said spring being secured adjacent its center to the downwardly bent portion 10 of the transverse plate 8 by means of a plate 13 underlying the central portion of the spring and secured to the frame by means of a plurality of U-bolts 14 embracing the transverse member 8 and the spring, each of the U-bolts being provided with a keeper 15 bearing against the lower surface of the plate 13. A bolt 14' may also be passed through the transverse member 8, the intermediate portion of the spring and the plate 13 to assist the U-bolts in firmly securing the spring to the end portion of the frame. The spring 12 is made up of a plurality of leaves 16, and U-clips 17 are provided for suitably securing the leaves together at intervals thereby preventing disengagement of the leaves from each other. Brake band housings 18 are provided from opposite end portions of the axle casing, and a bracket 19 is secured to or formed integral with one of the housings 18 which serves as a means for pivotally supporting one end of the spring 12 through a pin 20 passed through the opposite side edges of the bracket. A somewhat similar bracket 21 is formed integral with or supported by the opposite brake band housing, and a link 22 is pivotally supported by the bracket 21 and provided with a pin 23 to which the opposite end portion of the spring 12 is pivotally secured. It will be seen that this construction permits the expanding of the rear spring, as the link 22 may pivot about the bracket 21 whereby the distances between the points of support for the spring upon the axle may vary with the flexing of the spring.

A front spring 25 formed in a similar manner to the rear spring previously described, and being of the semi-elliptical type having the portion intermediate its ends bowed transversely from the vertical plane passing through the ends thereof is mounted beneath the depressed portion 9 of the member 7 to which the central portion of the spring is secured by means of a plate 26 positioned beneath the spring and secured to the cross member 7 by means of a plurality of U-bolts 27, each of which is provided with a keeper 28 bearing against the lower surface of the plate 26. A bolt 29 is passed through the depressed portion 9 of the cross member, the spring, and the plate 26, and extends downwardly below the plate 26 for a purpose which will be hereinafter described. The spring 25 is made up of a plurality of separate leaves, certain of which may be retained in position relative to each other by means of suitable clips 30. The outwardly extending end portions of the spring 25 are pivotally secured to suitable brackets 31 carried by the axle 1 so as to be pivotally connected thereto. Bolts 32 extend downwardly through the axle 1, which bolts may be formed integral with the supporting brackets 31 and serve as anchoring means for the radius rods 33 which will be fully described hereinafter. These radius rods or members 33 may be constructed in any suitable manner, and in the embodiment shown herewith they are shown as being formed of suitable flat resilient material similar to that of which the separate leaves of the springs are constructed. The bolt 29 passed through the central portion of the front spring has a branched lower portion, the branches 34 and 35 extending downwardly and serving as anchoring means located near the longitudinal center of the spring for securing the opposite ends of the radius rods from those attached to the bolts 32 to the frame adjacent the central longitudinal line thereof.

By means of the position of radius rods 33 connecting the front end portion of the frame with the axle an additional supporting means is provided for the frame, and by the provision of the parallel connecting members including the end portions of the springs and the radius rods a parallel linkage is provided which assists in maintaining the axle in a vertical plane at all times.

While I have shown and described in considerable detail a specific embodiment of my invention, it is to be understood that this showing and description is illustrative only and for the purpose of rendering my invention more clear, and that I do not regard the invention as limited to the details of construction illustrated or described except in so far as I have included such limitations within the terms of the following claims, in which it is my intention to claim all novelty inherent in my invention broadly as well as specifically.

What I claim as new and desire to secure by Letters Patent is:

1. In a vehicle, an axle, a frame, a semi-elliptical spring having the portion intermediate its ends bowed transversely from the vertical plane passed through the ends thereof, the said bowed portion extending outwardly beyond the axle and means for securing a portion of the frame to the outwardly bowed portion of the spring.

2. In a vehicle, an axle, a frame and a semi-elliptical spring connecting the frame and axle and having the portion intermediate its ends bowed transversely from the vertical plane passed through the ends thereof, the ends of the spring being connected to the axle.

3. In a vehicle, an axle, a frame extending beyond said axle, and a spring of the semi-elliptical type being connected to the frame and having the portion intermediate its ends bowed transversely from the vertical plane passed through the ends thereof, the ends of the springs being connected to the ends of the axles.

4. In a vehicle structure, a vehicle frame having its end portions reduced in width relative to the intermediate portions thereof, front and rear axles, and semi-elliptical springs connecting the frame to the axles and having the portion intermediate their ends bowed transversely from the vertical plane passed through the ends thereof, the said bowed portions being connected to the end portions of the frame.

5. In a vehicle structure, a frame having its end portions reduced in width relative to the intermediate portion thereof, front and rear axles, and semi-elliptical springs connecting the end portions of the frame to the front and rear axles respectively, each spring having the portion intermediate its ends bowed transversely from the vertical plane passed through the ends thereof, said bowed portions of the springs extending outwardly beyond the middle of the front and rear axles.

6. In a spring suspension for vehicles, a frame, an axle, a semi-elliptical spring having the portions intermediate its ends bowed transversely from the vertical plane passed through the ends thereof and having its intermediate portion secured to one end of the frame and its ends secured to the axle, and a pair of radius rods each of which extends substantially parallel to one end portion of the spring and is connected at its ends to the frame and axle respectively.

7. In a spring suspension for vehicles, an axle, a frame extending beyond the axle, and a semi-elliptical spring having its intermediate portion rigidly secured to the end of the frame near the longitudinal center line thereof and extending divergently therefrom towards the axle, the ends of the spring being secured to the axle at points near the ends thereof.

8. In a spring suspension for vehicles, a frame, an axle, a bowed semi-elliptical spring having its intermediate portion rigidly secured to the frame at points near the longitudinal center line thereof and extending divergently therefrom the ends of the spring being secured to the axle at points near the ends thereof, and a pair of radius rods each of which extends in a direction substantially parallel to one end of the spring and is connected at its ends to the frame and axle respectively.

9. In a spring suspension for vehicles, a frame, axles, and semi-elliptical springs having a portion intermediate the ends of each spring firmly secured to the front and rear ends of the frame, portions of the springs on opposite sides of the intermediate portions diverging inwardly in the same horizontal plane and then downwardly, the ends of the springs being connected to the adjacent axles at points near the ends thereof.

10. In a spring suspension for vehicles, an axle, a frame having a constricted end projecting outwardly beyond the axle, a spring secured at its intermediate portion to the projecting end of the frame, and radius rods connected to the projecting end of the frame, the said springs and radius rods diverging rearwardly towards and having connections with the axle.

11. In a spring suspension for vehicles, an axle, a frame having parallel side bars and members connecting the ends of the side bars, a spring connected intermediate its ends to one of said members below the horizontal plane of the side bars and diverging rearwardly, the ends of said spring being connected to the axle.

In testimony whereof, I affix my signature.

EDWARD H. BELDEN.